United States Patent
Hsieh (10) Patent No.: US 8,502,576 B2
(45) Date of Patent: Aug. 6, 2013

(54) CHARGE PUMP CIRCUIT

(75) Inventor: Yi Bin Hsieh, Hsinchu County (TW)

(73) Assignee: Ralink Technology Corporation, Jhubei, Hsinchu County (TW)

( * ) Notice: Subject to any disclaimer, the term of this patent is extended or adjusted under 35 U.S.C. 154(b) by 0 days.

(21) Appl. No.: 13/243,414

(22) Filed: Sep. 23, 2011

(65) Prior Publication Data

US 2012/0280744 A1 Nov. 8, 2012

(30) Foreign Application Priority Data

May 6, 2011 (TW) ............................ 100115888 A (51) Int. Cl.
*H03L 7/06* (2006.01)
(52) U.S. Cl.
USPC .......................................... 327/157; 327/148
(58) Field of Classification Search
USPC .................................................. 327/148, 157
See application file for complete search history.

(56) References Cited

U.S. PATENT DOCUMENTS

| | | | | |
|---|---|---|---|---|
| 6,278,332 B1 * | 8/2001 | Nelson et al. | .................... | 331/17 |
| 6,661,683 B2 * | 12/2003 | Botker et al. | .................... | 363/60 |
| 7,012,473 B1 * | 3/2006 | Kokolakis | ........................ | 331/17 |
| 7,285,995 B2 * | 10/2007 | Kaizuka | ......................... | 327/157 |
| 7,786,773 B2 * | 8/2010 | Weng et al. | .................... | 327/156 |
| 7,977,984 B1 * | 7/2011 | D'Souza et al. | .............. | 327/157 |
| 8,063,678 B2 * | 11/2011 | Wadhwa et al. | .............. | 327/157 |
| 8,217,693 B2 * | 7/2012 | Mei et al. | ....................... | 327/157 |
| 8,232,822 B2 * | 7/2012 | Tsai | ................................ | 327/157 |
| 2003/0174524 A1 * | 9/2003 | Botker et al. | .................... | 363/60 |
| 2005/0189973 A1 * | 9/2005 | Li | ................................ | 327/157 |
| 2006/0125535 A1 * | 6/2006 | Caplan et al. | ................. | 327/156 |
| 2010/0283517 A1 * | 11/2010 | Wadhwa et al. | .............. | 327/157 |
| 2011/0199136 A1 * | 8/2011 | Tsai | ................................ | 327/157 |
| 2011/0215849 A1 * | 9/2011 | Wadhwa et al. | .............. | 327/157 |
| 2012/0194238 A1 * | 8/2012 | Maneatis et al. | .............. | 327/157 |

* cited by examiner

*Primary Examiner* — Adam Houston
(74) *Attorney, Agent, or Firm* — Hamre, Schumann, Mueller & Larson, P.C.

(57) ABSTRACT

A charge pump circuit includes a charge generation circuit, a tracking circuit, a replica circuit, and a main charge pump. The main charge pump generates a charge current and a discharge current to a subsequent loop filter according to a UP signal and a DOWN signal. The replica circuit generates a first voltage in response to the current values of the first current source and the second current source of the main charge pump. The tracking circuit adjusts the current values of the first current source and the second current source of the main charge pump according to the first voltage and a second voltage, wherein the second voltage is in response to a voltage of an output node of the main charge pump.

16 Claims, 10 Drawing Sheets

CHARGE PUMP CIRCUIT

BACKGROUND OF THE INVENTION

1. Field of the Invention

The present invention relates to a charge pump (CP) circuit, and more particularly, to a CP circuit having a balanced charge current and discharge current.

2. Description of the Related Art

Figure 1:
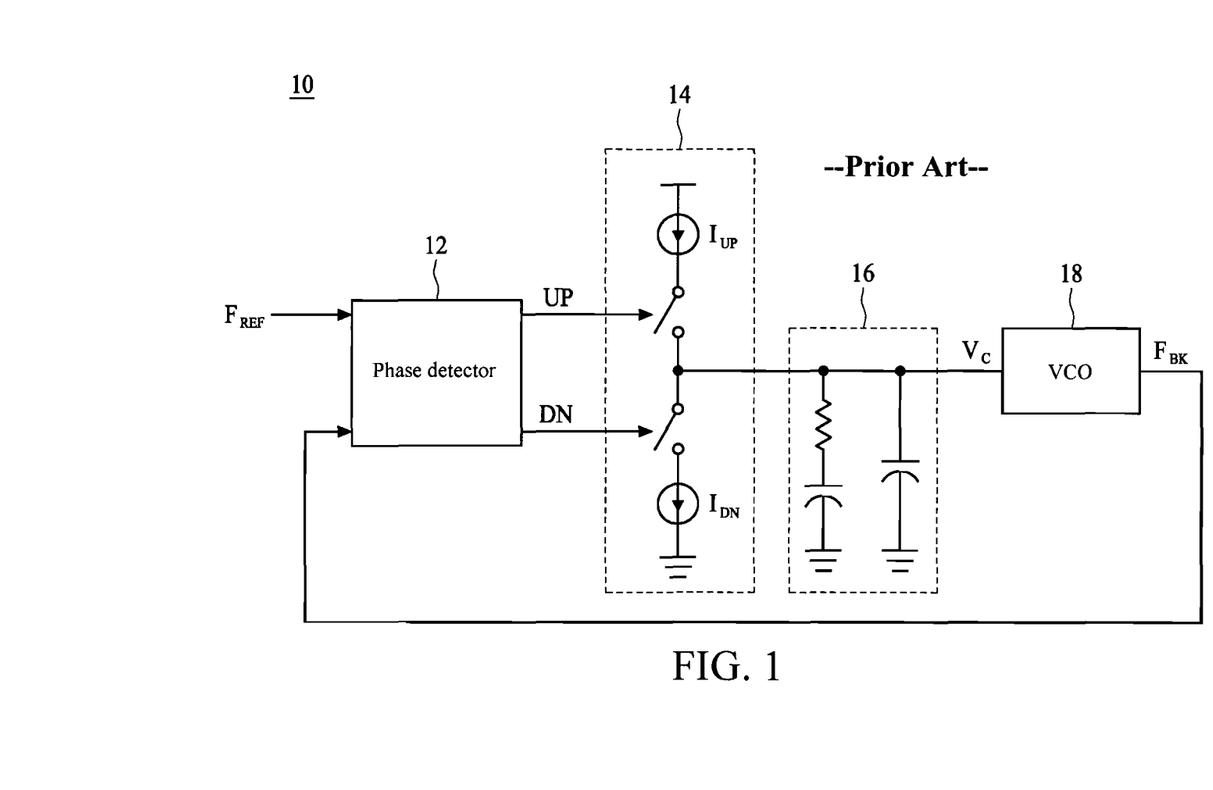
FIG. 1 is a schematic block diagram of a typical PLL.

A Phase Lock Loop (PLL) is a feedback system for comparing an output phase and an input phase. The PLL is applicable in frequency generators, wireless receivers, and communication devices to control the frequency of operation. FIG. 1 is a schematic block diagram of a typical PLL 10. As shown in FIG. 1, a phase detector 12 generates an UP signal UP and a DOWN signal DN according to a phase difference (or a frequency difference) between a reference clock signal $F_{REF}$ and a feedback clock signal $F_{BK}$. When the UP signal UP is enabled, an UP current $I_{UP}$ flows out from a CP circuit 14 to a loop filter 16. When the DOWN signal DN is enabled, a DOWN current $I_{DN}$ is drawn from the loop filter 16 by the CP circuit 14. The loop filter 16 performs charge and discharge actions according to the UP current $I_{UP}$ and the DOWN current $I_{DN}$ to generate a loop filter voltage $V_C$.

As shown in FIG. 1, a voltage controlled oscillator (VCO) 18 generates a feedback clock signal $F_{BK}$ according to the loop filter voltage $V_C$. In the foregoing operation mode, through the generation of the UP signal UP and the DOWN signal DN, a phase difference (or frequency difference) between the reference clock signal $F_{REF}$ and the feedback clock signal $F_{BK}$ gradually decreases.

The performance of the CP circuit 14 has a direct relation with the effect of the PLL 10. When the UP current $I_{UP}$ does not exactly match the DOWN current $I_{DN}$, a continuous ripple may be generated when the PLL 10 is locked. Furthermore, due to deterioration of track characteristics, jitter may occur at an output end of the PLL 10.

Figure 2:
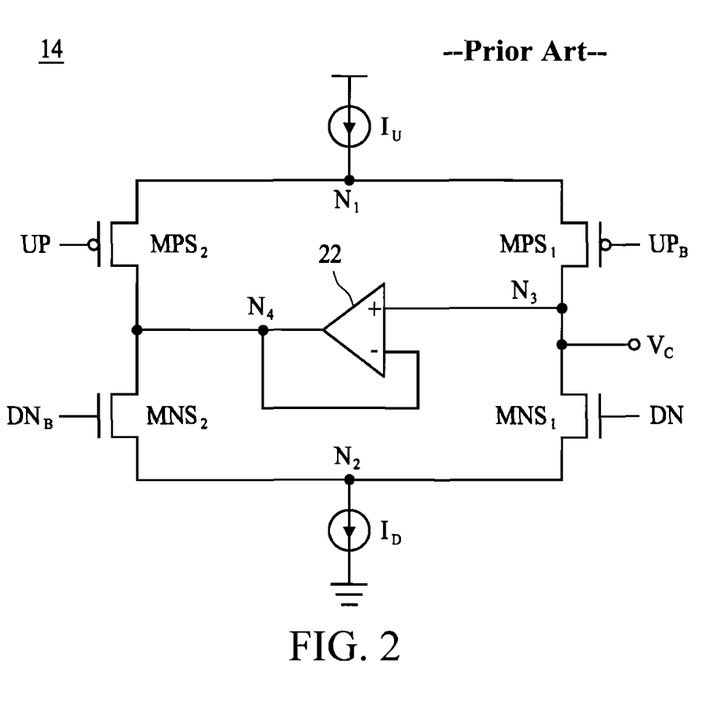
FIG. 2 is a schematic circuit diagram of a conventional CP circuit.

FIG. 2 is a schematic circuit diagram of a conventional CP circuit 14. As shown in FIG. 2, the conventional CP circuit 14 includes an UP current source $I_U$, a DOWN current source $I_D$, p-Mental-Oxide-Semiconductor (PMOS) transistors $MPS_1$ and $MPS_2$, n-Mental-Oxide-Semiconductor (NMOS) transistors $MNS_1$ and $MNS_2$ and an operational amplifier 22. The PMOS transistors $MPS_1$ and $MPS_2$ are alternately turned on according to a signal UP and a complementary signal $UP_B$ applied on a gate, and the NMOS transistors $MNS_1$ and $MNS_2$ are alternately turned on according to a signal DN and a complementary signal $DN_B$ applied on the gate. The operational amplifier 22 is connected between a node $N_3$ and a node $N_4$ through a unity gain buffer. That is to say, the gain of the operational amplifier 22 is 1, and an output end voltage of operational amplifier 22 is equal to an input end voltage thereof constantly.

In operation, an input end voltage $V_C$ of the operational amplifier 22 changes according to the signal UP and the signal DN. For example, when the signal UP=1, the signal $UP_B$=0, the signal DN=0, and the signal $DN_B$=1, the PMOS transistor $MPS_1$ and the NMOS transistor $MNS_2$ are turned on, while the PMOS transistor $MPS_2$ and the NMOS transistor $MNS_1$ are turned off, so that the voltage $V_C$ increases to a voltage on a node $N_1$. When the signal UP=0, the signal $UP_B$=1, the signal DN=1, the signal $DN_B$=0, the PMOS transistor $MPS_2$ and the NMOS transistor $MNS_1$ are turned on, while the PMOS transistor $MPS_1$ and the $NMO_S$ transistor $MNS_2$ are turned off, so that the voltage $V_C$ decreases to a voltage of a node $N_2$. When the voltage $V_C$ changes, head voltages of the UP current source $I_U$ and the DOWN current source $I_D$ of the channel length modulation are affected, so that the current values of the UP current source $I_U$ and the DOWN current source $I_D$ are not exactly equal to each other. This situation becomes more severe in a sub-micron process and under a low supply voltage.

Figure 3A:
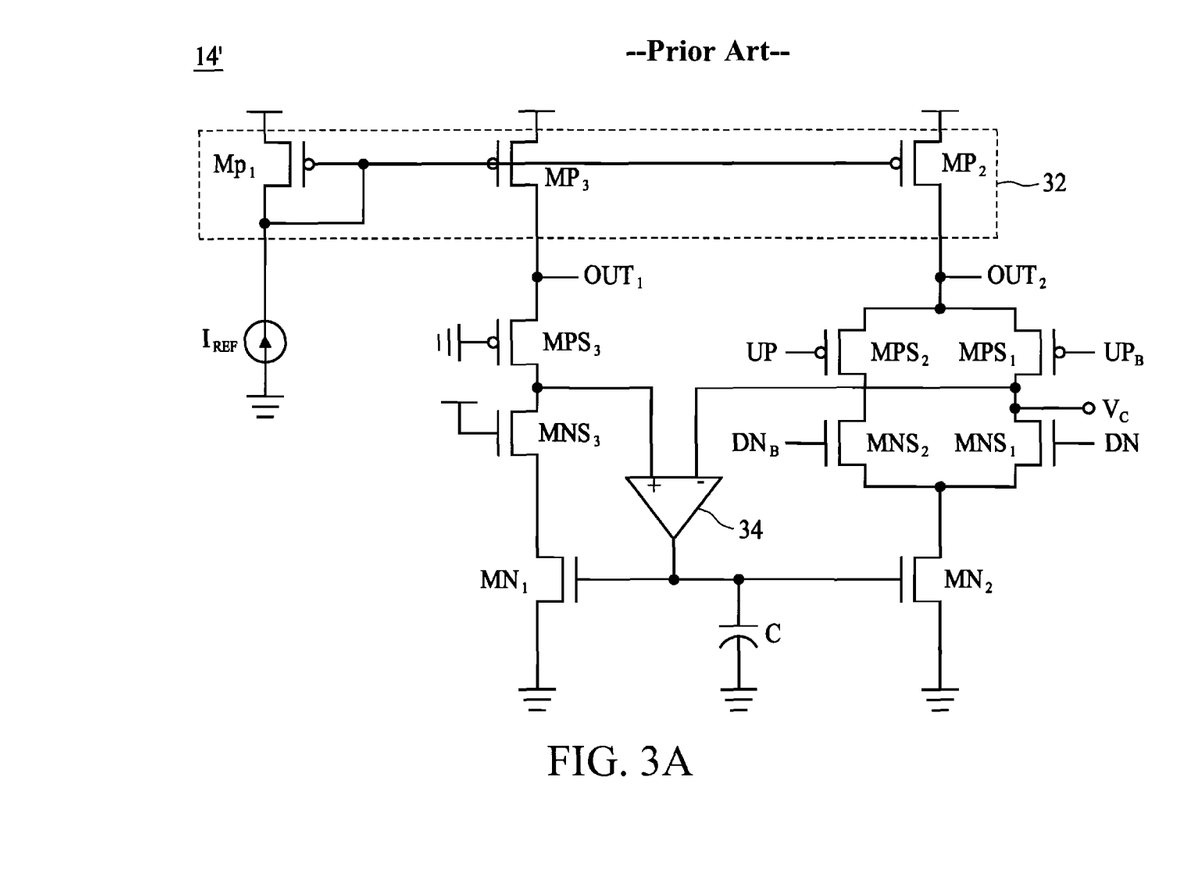
FIG. 3A is a schematic circuit diagram of another conventional CP circuit.

FIG. 3A is a schematic circuit diagram of another conventional CP circuit 14'. As shown in FIG. 3, the conventional CP circuit 14' includes a first current mirror circuit 32, PMOS transistors $MPS_1$ to $MPS_3$, NMOS transistors $MNS_1$ to $MNS_3$, NMOS transistors $MN_1$ and $MN_2$, and an operational amplifier 22. The first current mirror circuit 32 includes PMOS transistors $MP_1$, $MP_2$ and $MP_3$.

In operation, the operational amplifier 32 forces a voltage of an output end $OUT_1$ of the first current mirror circuit 32 to be equal to a voltage of an output end $OUT_2$, and force a drain voltage of the NMOS transistor $MN_1$ to be equal to a drain voltage of the NMOS transistor $MN_2$. Therefore, a current flowing through the PMOS transistor $MP_3$ of the first current mirror circuit 32 matches a current flowing through the PMOS transistor $MP_2$, and a current flowing through the NMOS transistor $MN_1$ matches a current flowing through the NMOS transistor $MN_2$. As the current flowing through the PMOS transistor $MP_3$ is equal to the current flowing through the NMOS transistor $MN_2$, the current flowing through the PMOS transistor $MP_2$ is substantially the same as the current flowing through the NMOS transistor $MN_2$.

However, the conventional structures have the following disadvantages in operation. First, as the CP circuit 14' has a large loop gain value, a capacitor C having a large capacitance is required to improve loop stability. Second, the value of the current flowing through the PMOS transistor $MP_2$ and the value of the current flowing through the NMOS transistor $MN_2$ depend on the voltage of an output end of the operational amplifier 22, so the current values of the PMOS transistor $MP_2$ and NMOS transistor $MN_2$ are not absolute values. Furthermore, the CP circuit 14' requires a start circuit to solve the bias problem occurring when the operational amplifier 22 is on.

Figure 3B:
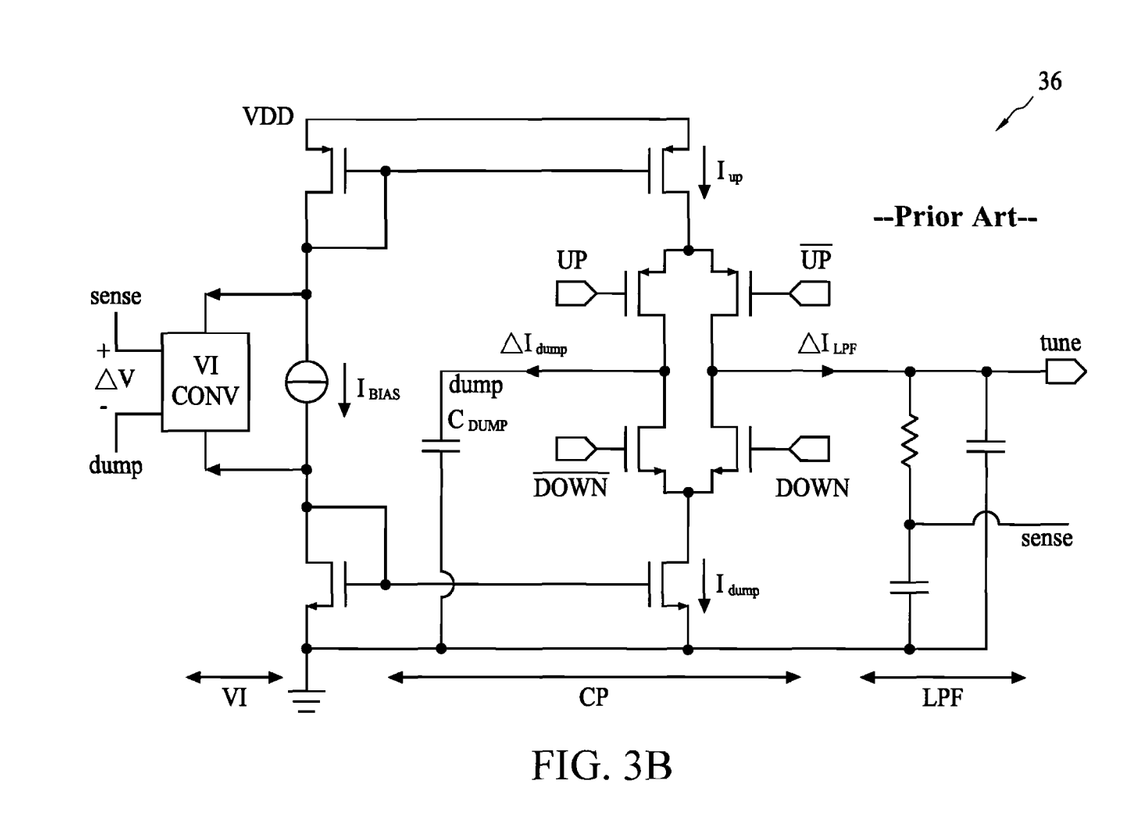
FIG. 3B is a schematic circuit diagram of another conventional CP circuit.

FIG. 3B is a schematic circuit diagram of another conventional CP circuit. As shown in FIG. 3B, the conventional CP circuit 36 includes a main CP, a voltage to current converter VI, and a floating current source $I_{BIAS}$. The conventional CP circuit 36 monitors uplink and downlink currents and rectifies any non-matching states, for example, non-matching of operating points. The conventional CP circuit 36 detects a voltage difference between $V_{sense}$ and $V_{dump}$ by using the voltage-current converter VI and rectifies any non-matching states. The problems of the conventional CP circuit 36 lie in that the minimal $V_{DD}$ voltage is $2V_t+3V_{dsat}$, so the conventional CP circuit 36 cannot be applied on a system with a low-voltage design.

Accordingly, it is necessary to provide an improved CP circuit to solve the problems above.

SUMMARY OF THE INVENTION

The objective of the present invention is to provide a CP circuit. The CP circuit includes a charge generation circuit, a tracking circuit, a replica circuit, and a main CP. In an embodiment of the present invention, the main CP includes a first complementary switch pair, a second complementary switch pair, a first current source, a second current source and a unity gain buffer amplifier. The first complementary switch pair is selectively turned on according to an UP signal and a complementary UP signal. The second complementary switch pair is selectively turned on according to a DOWN signal and a complementary DOWN signal. The first current source is coupled between a power supply and the first complementary switch pair. The second current source is coupled between a common node and the second complementary switch pair. The unity gain buffer amplifier is coupled between the first complementary switch pair and the second complementary switch pair. The replica circuit is used to generate a first voltage in response to the current values of the first current source and the second current source of the main CP. The tracking circuit is used to adjust the current values of the first current source and the second current source of the main CP according to the first voltage and a second voltage, the second voltage is in response to the voltage of an output node of the main CP.

In another embodiment of the present invention, the main CP includes a first switch, a first current source, a second current source, and a second switch. The first switch is coupled to a power supply, and is selectively turned on according to an UP signal. The first current source is coupled to the first switch. The second current source is coupled to the first current source. The first switch is coupled between the second current source and a common node, and is selectively turned on according to a DOWN signal. The replica circuit is used to generate a first voltage in response to current values of the first current source and the second current source of the main CP. The tracking circuit is used to adjust the current values of the first current source and the second current source of the main CP according to the first voltage and a second voltage, wherein the second voltage is in response to the voltage of an output node of the main CP.

BRIEF DESCRIPTION OF THE DRAWINGS

The invention will be described according to the appended drawings in which.

PREFERRED EMBODIMENT OF THE PRESENT INVENTION

Figure 4:
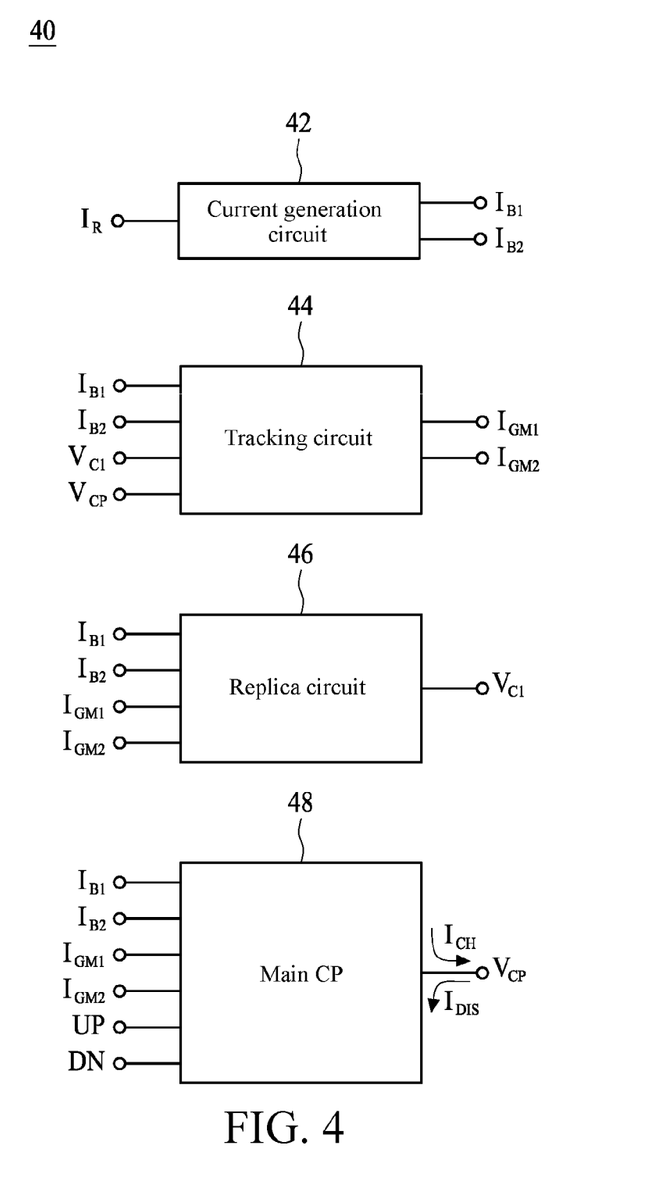
FIG. 4 is a schematic block diagram of a CP circuit according to an embodiment of the present invention.

FIG. 4 is a schematic block diagram of a CP circuit 40 according to an embodiment of the present invention. As shown in FIG. 4, the CP circuit 40 includes a charge generation circuit 42, a tracking circuit 44, a replica circuit 46, and a main CP 48. The main CP 48 is configured to generate a charge current $I_{CH}$ and a discharge current $I_{DIS}$ to a subsequent loop filter (not shown) according to an UP signal UP and a DOWN signal DN. Through the cooperation of the charge generation circuit 42, the tracking circuit 44 and the replica circuit 46, the main CP 48 can actively adjust current values of the charge current $I_{CH}$ and the discharge current $I_{DIS}$, so that the current value of the charge current $I_{CH}$ is substantially the same as the current value of the discharge current $I_{DIS}$.

Figure 5:
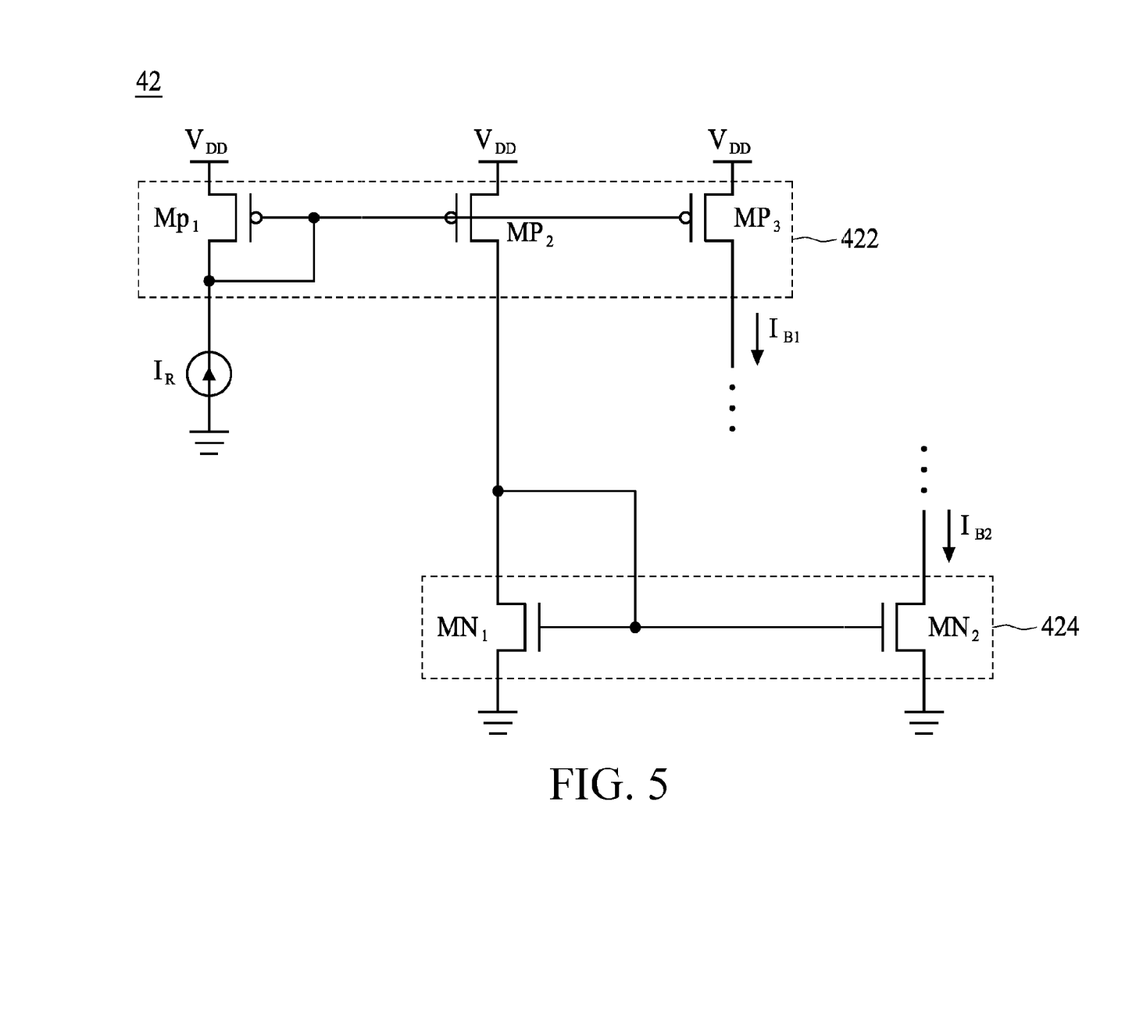
FIG. 5 is a schematic circuit diagram of a charge generation circuit according to an embodiment of the present invention.

FIG. 5 is a schematic circuit diagram of a charge generation circuit 42 according to an embodiment of the present invention. As shown in FIG. 5, the charge generation circuit 42 includes a first current mirror circuit 422 and a second current mirror circuit 424. The first current mirror circuit 422 comprises transistors $MP_1$, $MP_2$ and $MP_3$. The transistor $MP_3$ is configured to generate a bias current $IB_1$, which is directly proportional to a reference current $I_R$ flowing through the transistor $MP_1$. The second current mirror circuit 424 comprises transistors $MN_1$ and $MN_2$. The transistor $MN_1$ is configured to receive a current flowing through the transistor $MP_2$, and the transistor $MN_2$ is configured to mirror a current flowing through the transistor $MN_1$ to generate a bias current $IB_2$. Through the first current mirror circuit 422 and the second current mirror circuit 424, the bias current $IB_1$ and the bias current $IB_2$ are substantially equal to each other but with a small difference.

Figure 6:
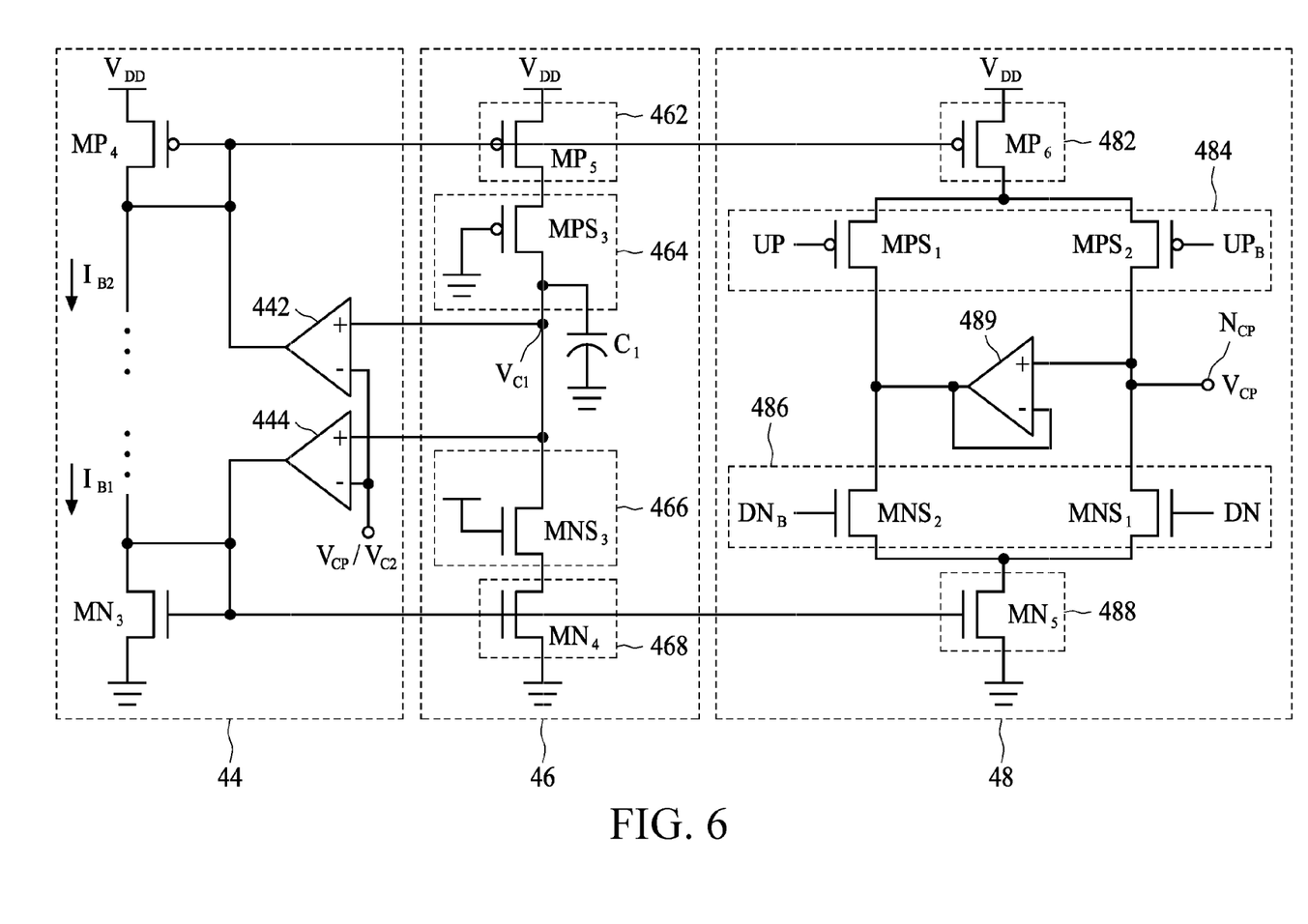
FIG. 6 is a schematic circuit diagram of a tracking circuit, a replica circuit, and a main CP according to an embodiment of the present invention.

FIG. 6 is a schematic circuit diagram of the tracking circuit 44, the replica circuit 46, and the main CP 48 according to an embodiment of the present invention. As shown in FIG. 6, the bias current $IB_2$ generated by the charge generation circuit 42 is sent to a drain of a PMOS transistor $MP_4$ in the tracking circuit 44. The drain and a gate of the PMOS transistor $MP_4$ are short circuited, and a source of the PMOS transistor $MP_4$ is coupled to a power supply $V_{DD}$. The bias current $IB_1$ generated by the charge generation circuit 42 is sent to a drain of an NMOS transistor $MN_3$ in the tracking circuit 44. The drain and a gate of the NMOS transistor $MN_3$ are short circuited, and a source of the NMOS transistor $MN_3$ is grounded.

As shown in FIG. 6, the main CP 48 comprises a first current source 482, a first complementary switch pair 484, a second complementary switch pair 486, a second current source 488 and an operational amplifier 489. In this embodiment, the first current source 482 is implemented as a PMOS transistor $MP_6$, and the second current source 488 is implemented as an NMOS transistor $MN_5$. The current of the PMOS transistor $MP_6$ is a current formed by mirroring the current flowing through the PMOS transistor $MP_4$ in the tracking circuit 44. The current of the NMOS transistor $MN_5$ is a current formed by mirroring the current flowing through the NMOS transistor $MN_3$ in the tracking circuit 44. The first complementary switch pair 484 comprises transistors $MPS_1$ and $MPS_2$, in which the transistors $MPS_1$ and $MPS_2$ are turned on according to a signal UP and a complementary signal $UP_B$ respectively. The second complementary switch pair 486 includes transistors $MNS_1$ and $MNS_2$, in which the transistors $MNS_1$ and $MNS_2$ are turned on according to a signal DN and a complementary signal $DN_B$ respectively. The operational amplifier 489 is connected between the first complementary switch pair 484 and the second complementary switch pair 486 through a unity gain buffer. That is to say, the gain of the operational amplifier 489 is 1, and an output end voltage is forced to be equal to an input end voltage $V_{CP}$.

As shown in FIG. 6, the replica circuit 46 comprises a first current source 462, a first switch 464, a second switch 466, a second current source 468, and a capacitor $C_1$, wherein the capacitor $C_1$ is coupled between the first switch 464 and the second switch 466. In this embodiment, the first current source 462 is implemented as a PMOS transistor $MP_5$. The current of the PMOS transistor $MP_5$ is a current formed by mirroring the current flowing through the PMOS transistor $MP_4$ in the tracking circuit 44. The second current source 468 is implemented as an NMOS transistor $MN_4$. The current of the NMOS transistor $MN_4$ is a current formed by mirroring the current flowing through the NMOS transistor $MN_3$ in the tracking circuit 44. The first switch 464 is implemented as a PMOS transistor $MPS_3$, and the second switch 466 is implemented as an NMOS transistor $MNS_3$. Circuit configuration of the replica circuit 46 is the same as or similar to that of the main CP 48. That is to say, the PMOS transistor $MP_5$ matches the PMOS transistor $MP_6$ of the main CP 48, the PMOS transistor $MPS_3$ matches the PMOS transistor $MPS_2$ or $MPS_1$ of the main CP 48, the NMOS transistor $MNS_3$ matches the NMOS transistor $MNS_2$ or $MNS_1$ of the main CP 48, and the NMOS transistor $MN_4$ matches the NMOS transistor $MN_5$ of the main CP 48.

Figure 7:
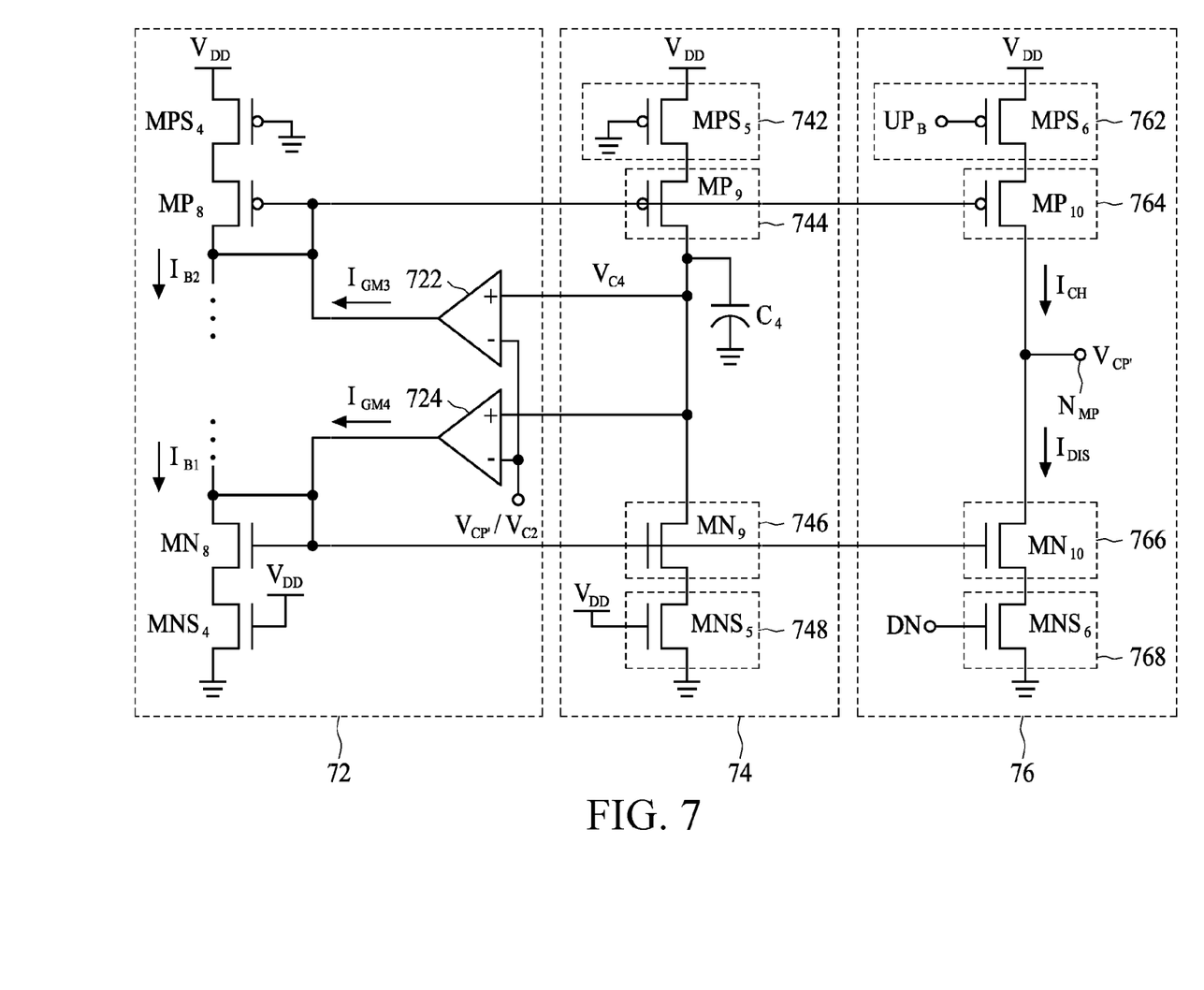
FIG. 7 is a schematic circuit diagram of the tracking circuit, the replica circuit, and the main CP, according to another embodiment of the present invention.

The circuit architecture of the main CP 48 as shown in FIG. 6 is an implementation aspect of the main CP; however, the present invention is not limited thereto. FIG. 7 is a schematic circuit diagram of a main CP 76 according to another embodiment of the present invention. As shown in FIG. 7, the main CP 76 includes a first switch 762, a first current source 764, a second current source 766, and a second current source 768. In this embodiment, the first switch 762 is implemented as a PMOS transistor $MPS_6$, the second switch 768 is implemented as an NMOS transistor $MNS_6$, the first current source 764 is implemented as a PMOS transistor $MP_{10}$, and the second current source 766 is implemented as an NMOS transistor $MN_{10}$.

FIG. 7 is a schematic circuit diagram of a tracking circuit 72 according to another embodiment of the present invention. As shown in FIG. 7, the tracking circuit 72 includes PMOS transistors $MPS_4$ and $MP_8$ and NMOS transistors $MN_8$ and $MNS_4$. A source of the PMOS transistor $MPS_4$ is coupled to the power supply $V_{DD}$, and a gate of the PMOS transistor $MPS_4$ is grounded. The bias current $IB_2$ generated by the charge generation circuit 42 is sent to a drain of the PMOS transistor $MP_8$. The drain and a gate of the PMOS transistor $MP_8$ are short circuited, and a source of the PMOS transistor $MP_8$ is coupled to the drain of the PMOS transistor $MPS_4$. A source of the NMOS transistor $MNS_4$ is grounded, and a gate of the NMOS transistor $MNS_4$ is connected to the power supply $V_{DD}$. The bias current $IB_1$ generated by the charge generation circuit 42 is sent to a drain of the NMOS transistor $MN_8$. A drain and a gate of the NMOS transistor $MN_3$ are short circuited, and a source of the NMOS transistor $MN_3$ is coupled to a drain of the NMOS transistor $MNS_4$.

As shown in FIG. 7, the current of the PMOS transistor $MP_{10}$ in the main CP 76 is a current formed by mirroring the current flowing through the PMOS transistor $MP_8$ in the tracking circuit 44. The current of the NMOS transistor $MN_{10}$ in the main CP 76 is a current formed by mirroring the current flowing through the NMOS transistor $MN_8$ in the tracking circuit 44. The transistor $MPS_6$ is turned on according to a complementary signal $UP_B$, and the transistor $MNS_6$ is turned on according to a signal DN. When the transistor $MPS_6$ is turned on, a charge current $I_{CH}$ flows out from a node $N_{MP}$; when the transistor $MNS_6$ is turned on, a discharge current $I_{DIS}$ flows in through the node $N_{MP}$.

FIG. 7 is a schematic circuit diagram of a replica circuit 74 according to another embodiment of the present invention. As shown in FIG. 7, the replica circuit 74 includes a first switch 742, a first current source 744, a second current source 746, a second switch 748, and a capacitor $C_4$, wherein the capacitor $C_4$ is coupled between the first current source 744 and the second switch 466. In this embodiment, the first switch 742 is implemented as a PMOS transistor $MPS_5$, the second switch 748 is implemented as an NMOS transistor $MNS_5$, the first current source 744 is implemented as a PMOS transistor $MP_9$, and the second current source 746 is implemented as an NMOS transistor $MN_9$. The PMOS transistor $MPS_5$ is coupled to the power supply $V_{DD}$, and matches the PMOS transistor $MPS_6$ in the main CP 76. The PMOS transistor $MP_9$ is coupled to the PMOS transistor $MPS_5$, and matches the PMOS transistor $MP_{10}$ in the main CP 76. The NMOS transistor $MN_9$ is coupled to the PMOS transistor $MP_9$, and matches the NMOS transistor $MN_{10}$ in the main CP 76. The NMOS transistor $MNS_5$ is coupled between the NMOS transistor $MN_9$ and the ground, and matches the NMOS transistor $MNS_6$ of the main CP 76. In other words, circuit configuration of the replica circuit 74 is the same as circuit configuration of the main CP 76. The replica circuit 74 is configured to generate a voltage $V_{C4}$, and the voltage $V_{C4}$ is in response to current values of the first current source 764 and the second current source 766 of the main CP 76.

As shown in FIG. 7, the tracking circuit 72 further comprises operational amplifiers 722 and 724. A positive input end of the operational amplifier 722 receives the voltage $V_{C4}$ on the capacitor $C_4$ in the replica circuit 46, a negative input end of the operational amplifier 722 receives a voltage $V_{CP}'$ of an output node of the main CP, and an output end of the operational amplifier 722 is connected to the gate of the PMOS transistor $MP_8$. A positive input end of the operational amplifier 724 receives the voltage $V_{C4}$, a negative input end of the operational amplifier 724 receives the voltage $V_{cp}$, and an output end of the operational amplifier 724 is connected to a gate of the NMOS transistor $MN_8$. Therefore, the operational amplifier 722 amplifies the voltage difference between the positive input end and the negative input end, converts the voltage difference into a current $I_{GM3}$, and injects the current $I_{GM3}$ to the PMOS transistor $MP_8$. Moreover, the operational amplifier 724 amplifies the voltage difference between the positive input end and the negative input end, converts the voltage difference into a current $I_{GM4}$, and injects the current $I_{GM4}$ to the NMOS transistor $MN_8$.

Figure 8:
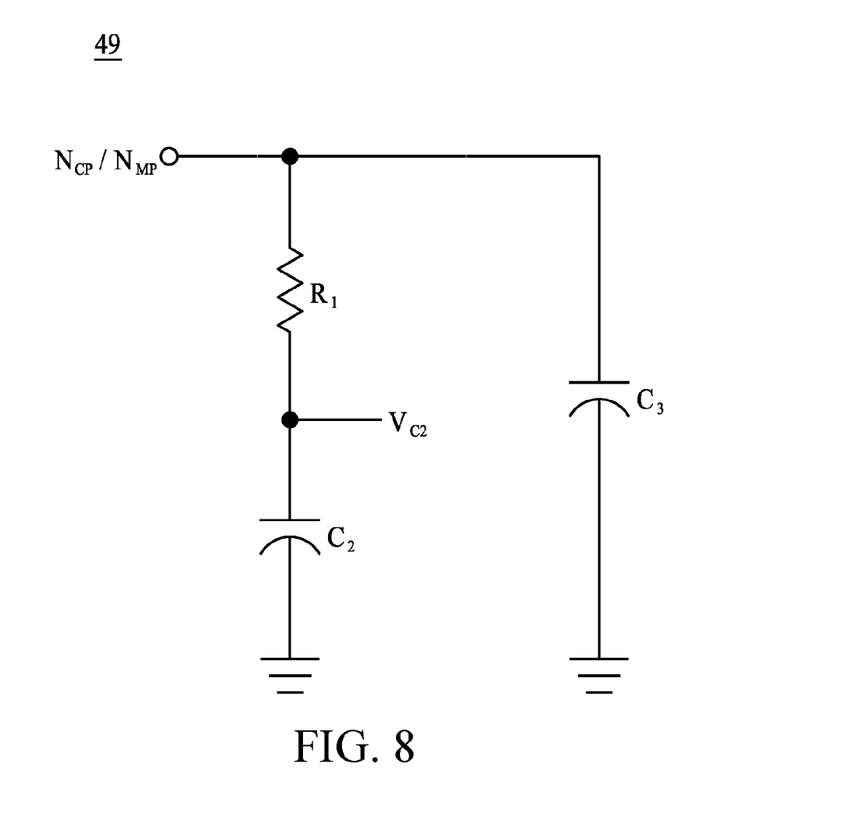
FIG. 8 is a schematic circuit diagram of a low-pass filter according to an embodiment of the present invention.

In another embodiment of the present invention, the CP circuit 40 further includes a low-pass filter 49, as shown in FIG. 8. The low-pass filter 49 is coupled to an output node $N_{CP}$ of the main CP 48 as shown in FIG. 6, or is coupled to an output node $N_{MP}$ of the main CP 76 as shown in FIG. 7. As shown in FIG. 8, the low-pass filter 49 is a resistor-capacitor network, including a resistor $R_1$, a capacitor $C_2$ and a capacitor $C_3$. The resistor $R_1$ is coupled to the output node $N_{CP}$ of the main CP 48 (or the output node $N_{MP}$ of the main CP 76), and the capacitor $C_2$ is coupled is between the resistor $R_1$ and the ground. In order to provide a stable output voltage, negative input ends of an operational amplifier 442 and an operational amplifier 444 in the tracking circuit in FIG. 6, or negative input ends of an operational amplifier 722 and an operational amplifier 724 in FIG. 7, can receive a voltage $V_{C2}$ on the capacitor $C_2$ in this embodiment.

An operation mode of the CP circuit 40 is illustrated with reference to FIG. 6. It should be noted that, the negative input ends of the operational amplifier 442 and the operational amplifier 444 in the tracking circuit can receive the voltage $V_{CP}$ of the output node of the main CP, or the negative input ends of the operational amplifier 442 and the operational amplifier 444 in the tracking circuit can receive the voltage $V_{C2}$ of the capacitor $C_2$ in the low-pass filter 49. In operation, when the current value of the first current source 482 in the main CP 48 is different from that of the second current source 488, a voltage $V_{C1}$ and a voltage $V_{CP}$ ($V_{C2}$) may be extruded to be close to the voltage of the power supply $V_{DD}$ or the ground. Meanwhile, the operational amplifier 442 and the operational amplifier 444 in the tracking circuit generate a current $I_{GM1}$ and a current $I_{GM2}$ according to the voltage difference between the voltage $V_{C1}$ and the voltage $V_{CP}$ ($V_{C2}$), so as to adjust the current values of the first current source 482 and the second current source 488. Finally, the current values of the first current source 482 and the second current source 488 can be kept the same even at different voltages $V_{CP}$.

Figure 9:
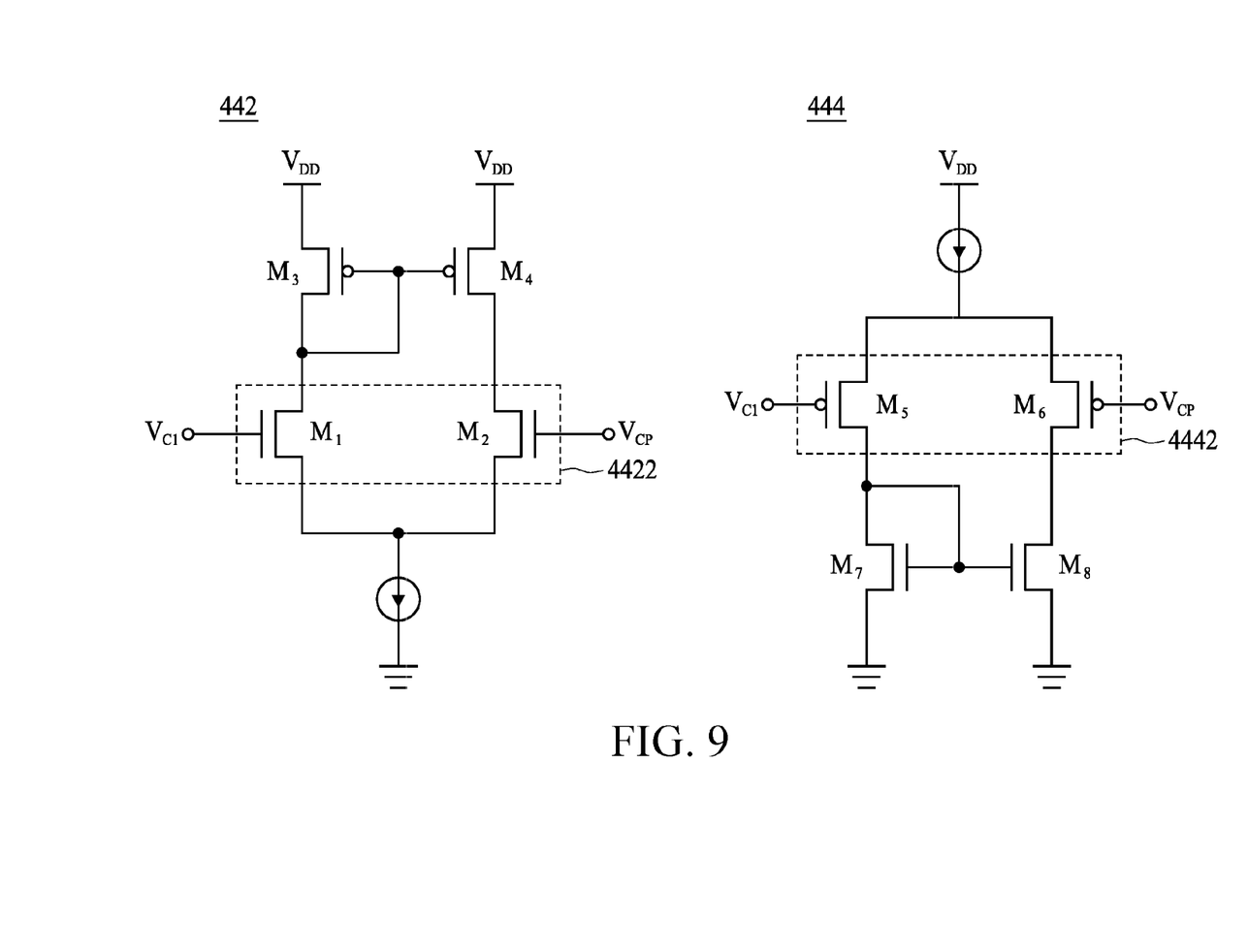
FIG. 9 is a schematic circuit diagram of an operational amplifier according to an embodiment of the present invention.

In an embodiment of the present invention, the operational amplifier 442 may be designed as an NMOS transistor differential pair operational amplifier, and the operational amplifier 444 may be designed as a PMOS transistor differential pair operational amplifier, as shown in FIG. 9. As shown in FIG. 9, the operational amplifier 442 includes a differential pair 4422 of NMOS transistors $M_1$ and $M_2$. Sources of the NMOS transistors $M_1$ and $M_2$ are connected to each other to form the differential pair 4422, and gates of the NMOS transistors $M_1$ and $M_2$ are constructed to receive the voltage $V_{C1}$ and the voltage $V_{CP}$ respectively. The operational amplifier 444 includes a differential pair 4442 of PMOS transistors $M_5$ and $M_6$. Sources of the PMOS transistors $M_5$ and the $M_6$ are connected to each other to form the differential pair 4442, and gates of the PMOS transistors $M_5$ and $M_6$ are constructed to receive the voltage $V_{C1}$ and the voltage $V_{CP}$ respectively.

In this embodiment, when the voltage $V_{C1}$ and the voltage $V_{CP}$ are close to the voltage of the power supply $V_{DD}$, the current values of the first current source 462 in the replica circuit 46 and the first current source 482 in the main CP 48 are decreased due to the channel modulation effect. At this time, the operational amplifier 442 in the tracking circuit 44 injects the current $I_{GM1}$ to the PMOS transistor $MP_4$, so as to increase the current values of the first current source 462 and that of the first current source 482. On the other hand, when the voltage $V_{C1}$ and the voltage $V_{CP}$ are close to the voltage of the ground, the current values of the second current source 468 in the replica circuit 46 and the second current source 488 in the main CP 48 are decreased due to the channel modulation effect. At this time, the operational amplifier 444 in the tracking circuit 44 injects the current $I_{GM2}$ to the NMOS transistor $MN_3$, so as to increase the current values of the second current source 468 and the second current source 488. Therefore, through cooperation of the tracking circuit 44 and the replica circuit 46, the main CP 48 actively adjust the current values of the first current source 482 and the second current source 488, so that the current value of the first current source 482 is substantially the same as the current value of the second current source 488.

Additionally, the CP circuit 40 is suitable to be operated at a low power supply $V_{DD}$. As shown in FIG. 6, the minimum value of the power supply $V_{DD}$ may reach $V_{TH}+2V_{DSAT}$, wherein $V_{TH}$ is a threshold voltage of a transistor, and $V_{DSAT}$ is a minimum drain-source voltage when a transistor is operated in a saturated regime. Therefore, the CP circuit 40 only requires a power supply of ($V_{TH}+2V_{DSAT}$) for operation. Furthermore, as the overall loop gain value of the CP circuit 44 is low, no extra capacitor with a large capacitance is required to compensate for the loop stability. The same operation principle and efficacy can be implemented by the tracking circuit 72, the replica circuit 74, and the main CP 76 in FIG. 7.

The technical contents and technical features of the present invention haven been disclosed as above, but persons skilled in the art can make various replacements and modifications based on the teaching and disclosure of the present invention without departing from the spirit of the present invention. Therefore, the protection scope of the present invention is not limited to the disclosure of the embodiments, but should cover various replacements and modifications without departing from the present invention, and shall fall within the scope defined by the appended claims.

What is claimed is:

1. A charge pump (CP) circuit, comprising:
a main CP, comprising:
    a first complementary switch pair, configured to be selectively turned on according to an UP signal and a complementary UP signal;
    a second complementary switch pair, configured to be selectively turned on according to a DOWN signal and a complementary DOWN signal;
    a first current source, coupled between a power supply and the first complementary switch pair;
    a second current source, coupled between a common node and the second complementary switch pair; and
    a unity gain buffer amplifier, coupled between the first complementary switch pair and the second complementary switch pair;
a replica circuit, configured to generate a first voltage, wherein the first voltage is in response to current values of the first current source and the second current source of the main CP; and
a tracking circuit, configured to adjust the current values of the first current source and the second current source of the main CP according to the first voltage and a second voltage, wherein the second voltage is in response to a voltage of an output node of the main CP,
wherein the tracking circuit comprises:
    an n-Mental-Oxide-Semiconductor (NMOS) transistor, having a source coupled to the common node and a gate connected to a drain, the drain being configured to receive a first bias current;
    a p-Mental-Oxide-Semiconductor (PMOS) transistor, having a source coupled to the power supply and a gate connected to a drain, the drain being configured to receive a second bias current;
    a first operational amplifier, having a first input end for receiving the first voltage, a second input end for receiving the second voltage, and an output end connected to the gate of the PMOS transistor; and
    a second operational amplifier, having a first input end for receiving the first voltage, a second input end for receiving the second voltage, and an output end connected to the gate of the NMOS transistor.

2. The CP circuit according to claim 1, wherein the replica circuit comprises:
    a first current source, coupled to the power supply, and matching the first current source in the main CP;
    a first switch, coupled to the first current source, and matching one switch in the first complementary switch pair;
    a second switch, coupled to the first switch, and matching one switch in the second complementary switch pair;
    a second current source, coupled between the second switch and the common node, and matching the second current source of the main CP; and
    a capacitor, coupled between the first switch and the second switch;
wherein the first voltage is a voltage on the capacitor.

3. The CP circuit according to claim 1, further comprising a low-pass filter coupled to the output node of the main CP, wherein the low-pass filter comprises a resistor-capacitor network.

4. The CP circuit according to claim 3, wherein the resistor-capacitor network comprises:
    a resistor, coupled to the output node of the main CP; and a capacitor, coupled between the resistor and the common node; wherein the second voltage is a voltage on the capacitor.

5. The CP circuit according to claim 1, wherein the second voltage is a voltage of the output node of the main CP.

6. The CP circuit according to claim 1, wherein the first operational amplifier is an NMOS transistor differential pair operational amplifier.

7. The CP circuit according to claim 1, wherein the second operational amplifier is a PMOS transistor differential pair operational amplifier.

8. The CP circuit according to claim 1, further comprising a charge generation circuit, wherein the charge generation circuit comprises:
 a first current mirror circuit, configured to generate the first bias current according to a reference current; and
 a second current mirror circuit, configured to receive a current output by the first current mirror circuit to generate the second bias current.

9. A charge pump (CP) circuit, comprising:
 a main CP, comprising:
  a first switch, coupled to a power supply, and configured to be selectively turned on according to an UP signal;
  a first current source, coupled to the first switch;
  a second current source, coupled to the first current source; and
  a second switch, coupled between the second current source and a common node, and configured to be selectively turned on according to a DOWN signal;
 a replica circuit, configured to generate a first voltage, wherein the first voltage is in response to current values of the first current source and the second current source of the main CP; and
 a tracking circuit, configured to adjust the current values of the first current source and the second current source of the main CP according to the first voltage and a second voltage, wherein the second voltage is in response to a voltage of an output node of the main CP,
 wherein the tracking circuit comprises:
  a first p-Metal-Oxide-Semiconductor (PMOS) transistor, having a source coupled to the power supply, and a gate connected to the common node;
  a second PMOS transistor, having a source coupled to a drain of the first PMOS transistor and a gate connected to a drain, the drain being configured to receive a second bias current, and;
  a first n-Metal-Oxide-Semiconductor (NMOS) transistor, having a gate connected to a drain the drain being configured to receive a first bias current;
  a second NMOS transistor, having a source coupled to the common node, a gate connected to the power supply, and a drain connected to a source of the first NMOS transistor;
  a first operational amplifier, having a first input end configured to receive the first voltage, a second input end configured to receive the second voltage, and an output end connected to the gate of the second PMOS transistor; and
  a second operational amplifier, having a first input end, configured to receive the first voltage, a second input end, configured to receive the second voltage, and an output end connected to the gate of the first NMOS transistor.

10. The CP circuit according to claim 9, wherein the replica circuit comprises:
 a first switch, coupled to the power supply, and matching the first switch in the main CP;
 a first current source, coupled to the first switch, and matching the first current source in the main CP;
 a second current source, coupled to the first current source, and matching the second current source in the main CP;
 a second switch, coupled between the second current source and the common node, and matching the second switch of the main CP; and
 a capacitor, coupled between the first current source and the second current source;
 wherein the first voltage is a voltage on the capacitor.

11. The CP circuit according to claim 9, further comprising a low-pass filter coupled to the output node of the main CP, wherein the low-pass filter comprises a resistor-capacitor network.

12. The CP circuit according to claim 11, wherein the resistor-capacitor network comprises:
 a resistor, coupled to the output node of the main CP; and
 a capacitor, coupled between the resistor and the common node;
 wherein the second voltage is a voltage on the capacitor.

13. The CP circuit according to claim 9, wherein the second voltage is a voltage of the output node of the main CP.

14. The CP circuit according to claim 9, wherein the first operational amplifier is an NMOS transistor differential pair operational amplifier.

15. The CP circuit according to claim 9, wherein the second operational amplifier is a PMOS transistor differential pair operational amplifier.

16. The CP circuit according to claim 9, further comprising a charge generation circuit, wherein the charge generation circuit comprises:
 a first current mirror circuit, configured to generate the first bias current according to a reference current; and
 a second current mirror circuit, configured to receive a current output by the first current mirror circuit to generate the second bias current.

* * * * *